(12) United States Patent
Harris

(10) Patent No.: US 8,235,591 B2
(45) Date of Patent: Aug. 7, 2012

(54) CORKSCREW WITH INTEGRAL INTELLIGENT THERMOMETER

(76) Inventor: Debra Fogel Harris, Boca Raton, FL (US)

(*) Notice: Subject to any disclaimer, the term of this patent is extended or adjusted under 35 U.S.C. 154(b) by 0 days.

(21) Appl. No.: 10/569,033

(22) PCT Filed: Oct. 1, 2004

(86) PCT No.: PCT/US2004/032416
§ 371 (c)(1),
(2), (4) Date: Feb. 17, 2006

(87) PCT Pub. No.: WO2005/036116
PCT Pub. Date: Apr. 21, 2005

(65) Prior Publication Data
US 2006/0233219 A1    Oct. 19, 2006

Related U.S. Application Data

(60) Provisional application No. 60/481,473, filed on Oct. 6, 2003, provisional application No. 60/521,239, filed on Mar. 18, 2004.

(51) Int. Cl.
*G01J 5/00* (2006.01)
*B67B 7/44* (2006.01)
*G01K 1/14* (2006.01)
(52) U.S. Cl. .......... 374/141; 374/150; 374/121; 81/3.09
(58) Field of Classification Search .......... 374/150–155, 374/121, 163, 183, 141, 120, 100, 109, 208; 250/338; 116/216; 99/DIG. 10, 646 C; 81/3.09, 81/3.27, 3.4, 3.55
See application file for complete search history.

(56) References Cited

U.S. PATENT DOCUMENTS

| D61,220 S | 7/1922 | Ochse |
| 4,437,359 A | 3/1984 | Dejoux et al. |
| 4,538,926 A | 9/1985 | Chretien |
| 4,878,588 A | 11/1989 | Ephraim |
| 4,919,983 A | 4/1990 | Fremin |
| 4,962,765 A | 10/1990 | Kung et al. |
| 4,996,895 A | 3/1991 | Puig |
| 5,005,446 A * | 4/1991 | Mackey ..................... 81/3.48 |

(Continued)

FOREIGN PATENT DOCUMENTS
WO    WO 8803512 A1 * 5/1988

OTHER PUBLICATIONS
WO88035512 to Turati, May 11, 1986.*

(Continued)

*Primary Examiner* — Gail Verbitsky
(74) *Attorney, Agent, or Firm* — John C. Smith

(57) ABSTRACT

An intelligent corkscrew device which determines the temperature of the bottle and informs the consumer as to what type of wine is suitable for that temperature. In a preferred embodiment, the corkscrew provides a temperature readout. Alternative embodiments provide entertainment features such as voice or other audio indications related to the temperature. Still other embodiments include visual indication such as lamps which indicate what type of wine would be proper for the temperature of the bottle being measured. The corkscrew uses thermal measurement of the exterior of the wine bottle to measure the temperature. The measurement is made by a temperature sensing device, such as a thermistor or infrared detector on the end of the lever arm or other suitable location.

4 Claims, 13 Drawing Sheets

U.S. PATENT DOCUMENTS

| | | | |
|---|---|---|---|
| 5,018,875 A * | 5/1991 | Cook | 374/208 |
| D347,775 S | 6/1994 | Seiler | |
| 5,454,282 A * | 10/1995 | Del Mistro | 81/3.48 |
| 5,482,373 A | 1/1996 | Hutchinson | |
| 5,553,941 A | 9/1996 | Cope | |
| 5,720,555 A | 2/1998 | Elele | |
| 5,738,442 A | 4/1998 | Paron et al. | |
| D393,993 S | 5/1998 | De Bergen | |
| D404,491 S | 1/1999 | Scott | |
| D416,773 S | 11/1999 | Cellini | |
| 5,983,783 A | 11/1999 | Archard et al. | |
| 5,997,927 A | 12/1999 | Gics | |
| 6,000,845 A | 12/1999 | Tymkewicz et al. | |
| 6,016,721 A * | 1/2000 | Braun | 81/3.29 |
| 6,116,116 A | 9/2000 | Brucart Puig et al. | |
| 6,158,227 A * | 12/2000 | Seeley | 62/56 |
| D446,436 S | 8/2001 | Christianson | |
| D455,623 S | 4/2002 | Farfalli | |
| 6,536,306 B1 * | 3/2003 | Harris | 81/3.09 |
| 6,722,782 B2 * | 4/2004 | Faries et al. | 374/162 |
| 6,751,497 B2 * | 6/2004 | Fraden | 600/474 |
| D497,528 S | 10/2004 | Harris | |
| 6,854,883 B2 * | 2/2005 | Rund et al. | 374/208 |
| 6,929,607 B2 * | 8/2005 | Lipman | 600/300 |
| D524,610 S * | 7/2006 | Kushner | D7/683 |
| 7,265,673 B2 * | 9/2007 | Teller | 340/572.1 |
| 2001/0032867 A1 * | 10/2001 | Silbert | 224/148.5 |
| 2001/0040911 A1 * | 11/2001 | Rubenstein | 374/141 |
| 2002/0024990 A1 * | 2/2002 | Faries et al. | 374/162 |
| 2002/0191673 A1 * | 12/2002 | Lee | 374/141 |
| 2003/0212339 A1 * | 11/2003 | Lussier et al. | 600/549 |
| 2004/0247001 A1 * | 12/2004 | Kusnezow | 372/22 |
| 2004/0247015 A1 | 12/2004 | Wojan et al. | |
| 2006/0026971 A1 * | 2/2006 | Sharpe | 62/126 |
| 2006/0109886 A1 | 5/2006 | Harris | |
| 2007/0047620 A1 * | 3/2007 | Lumpkin | 374/208 |
| 2007/0133654 A1 * | 6/2007 | Harris | 374/121 |
| 2007/0171957 A1 | 7/2007 | Harris | |
| 2008/0173135 A1 * | 7/2008 | Beard | 81/3.09 |
| 2008/0272916 A1 * | 11/2008 | Breysse et al. | 340/572.8 |
| 2010/0319494 A1 * | 12/2010 | Chaffins | 81/3.09 |

OTHER PUBLICATIONS

U.S. Appl. No. 60/522,862 (abandoned), filed Nov. 15, 2004; Applicant: Debra Harris.

U.S. Appl. No. 60/593,276 (abandoned), filed Jan. 3, 2005; Applicant: Debra Harris.

U.S. Appl. No. 60/708,252 (abandoned), filed Aug. 15, 2005; Applicant: Debra Harris.

U.S. Appl. No. 60/481,473 (abandoned), filed Oct. 6, 2003; Applicant: Debra Harris.

U.S. Appl. No. 60/521,239 (abandoned), filed Mar. 18, 2004; Applicant: Debra Harris.

PCT Patent Application No. PCT/US2004/032416; Filing Date: Oct. 1, 2004; Applicant: Debra Harris.

Instructions from the device in the Rubenstein application (Cite 1) p. 2 lists requirement that the probe cannot touch the bottle.

The Ultimate Corkscrew book by Donald A. Bull; © 1999;ISBN:0-7643-7643-0701-0;p. 177 waiter's friends middle and bottom of page.

Printout of Webster.com online definition of "corkscrew".

U.S. Appl. No. 60/585,684, filed Jul. 6, 2004; Applicant: Riche Sharpe.

* cited by examiner

CORKSCREW WITH INTEGRAL INTELLIGENT THERMOMETER

CROSS-REFERENCE TO RELATED APPLICATIONS

This application is related to, and claims the benefit of, the design patent application entitled "Cork Screw with Integral Intelligent Thermometer", filed Oct. 2, 2003, bearing U.S. Ser. No. 29/191,195 and naming Debra Fogel Harris, the named inventor herein, as sole inventor, the contents of which is specifically incorporated by reference herein in its entirety, and further claims the benefit of, the provisional patent application entitled "Cork Screw with Integral Intelligent Thermometer", filed Oct. 6, 2003, bearing U.S. Ser. No. 60/481,473 and naming Debra Fogel Harris, the named inventor herein, as sole inventor, the contents of which is specifically incorporated by reference herein in its entirety, and further claims the benefit of, the provisional patent application entitled "Cork Screw with Integral Intelligent Thermometer", filed Mar. 18, 2004, bearing U.S. Ser. No. 60/521,239 and naming Debra Fogel Harris, the named inventor herein, as sole inventor, the contents of which is specifically incorporated by reference herein in its entirety.

BACKGROUND

1. Technical Field

The present invention relates to wine equipment. In particular, it relates to an intelligent cork screw which has an integral temperature sensing device which is used in combination with audio or video output devices to tell the user what the current temperature of the wine is, and what wines are appropriate for that particular temperature. The intelligent cork screw has several optional output methods which include audio notification and/or visual notification. Further, it relates to methods of detecting bottle temperature using direct contact the reserve devices, or infrared measurement which can be made at a distance from a wine bottle.

2. Background Art

There is a large segment of the population who enjoy wine on a regular basis with meals, and at social occasions. To best enjoy a particular type of wine should be served within a temperature range suitable for that wine. For example, sparkling lines such as champagne are typically served cold, white wines are typically served slightly warmer sparkling wines, red wines are served warmer than white wines, and special wines such as sherry or port are served warmer than red wines.

A disadvantage associated with the enjoyment of wine is that the consumer may not know the proper temperature for the particular wine the consumer plans to drink that evening. Wine producers have attempted to assist consumers by printing the best temperature on wine labels. This simple step makes available to the consumer the correct temperature for consumption, but the consumer must still determine what the actual temperature of the wine is.

One attempt to improve upon the mere listing of the correct temperature has been to adhere a thermal strip thermometer to the side of the wine bottle. This allows a direct readout of the temperature of the wine. While this approach is convenient when preparing to drink the wine, it also has several disadvantages. One such disadvantage is the cost associated with attaching the thermal strip thermometer to the side of the wine bottle which is then discarded with the bottle. An additional disadvantage to this approach is that either the manufacturer, the merchant, or the consumer must bear the time, effort and expense involved with purchasing, stocking, and applying the thermal strip thermometers. It would be desirable to have a convenient and reusable method of determining the temperature of the wine prior to consumption.

It would also be desirable to provide a convenient and entertaining method of informing the consumer that the wine is at the correct temperature. By having a temperature indication system which was entertaining, consumers would be more likely to use it. In addition, the user would receive greater enjoyment from the wine by receiving training in what the proper temperature of that particular wine should be.

A problem associated with prior art methods of measuring wine temperature is that prior art devices typically require that the measurement device inserted into the wine. Of course, this is an undesirable method of measuring temperature because the measurement device comes in contact with the wine and requires that the cork seal be broken. In the event that the wine is not at the desired temperature, the wine tastes may be affected. It would be desirable to have a method of measuring wine temperature without breaking the seal on the wine bottle.

It would be desirable to have a method of measuring when the temperature is optimal by contacting the outside of the wine bottle, or alternatively, measuring the temperature of the wine inside the bottle without making any contact with the bottle.

While addressing the basic desirability of drinking wine at the proper temperature, the prior art has failed to provide a convenient reusable device which is inexpensive to manufacture, provides a variety of information to the consumer, encourages its use, and provides entertainment to the consumer when it is used, and allows an individual to ascertain the temperature of the wine inside the bottle without breaking the seal or opening the bottle.

SUMMARY OF THE INVENTION

The present invention solves the foregoing problems by providing an intelligent cork screw device which determines the temperature of the bottle. The intelligent cork screw then provides information to the consumer related to the wine. In a preferred embodiment, the cork screw provides a temperature readout. Alternative embodiments include temperature gauges which are marked to indicate the wines which are appropriate for that temperature. Other alternative embodiment's provide entertainment features such as voice or other audio indications related to the temperature. Still other embodiments include visual indication such as lamps which indicate what type of wine would be proper for the temperature of the bottle being measured. The cork screw can use thermal measurement of the exterior of the wine bottle, or alternatively, the actual screw which penetrates the wine cork can be used as a temperature probe.

This invention provides a cork screw that is structured in the form of a waiter's corkscrew, which has a temperature sensor built into the lever arm that is used to press against the bottle when the cork is extracted.

The corkscrew can determine temperature using a thermistor device which is placed in contact with the surface of the wine bottle, or with an infrared temperature sensor which can measure the wine temperature inside of the bottle without breaking the seal of the bottle.

DESCRIPTION OF THE PREFERRED EMBODIMENT

Figure 1:
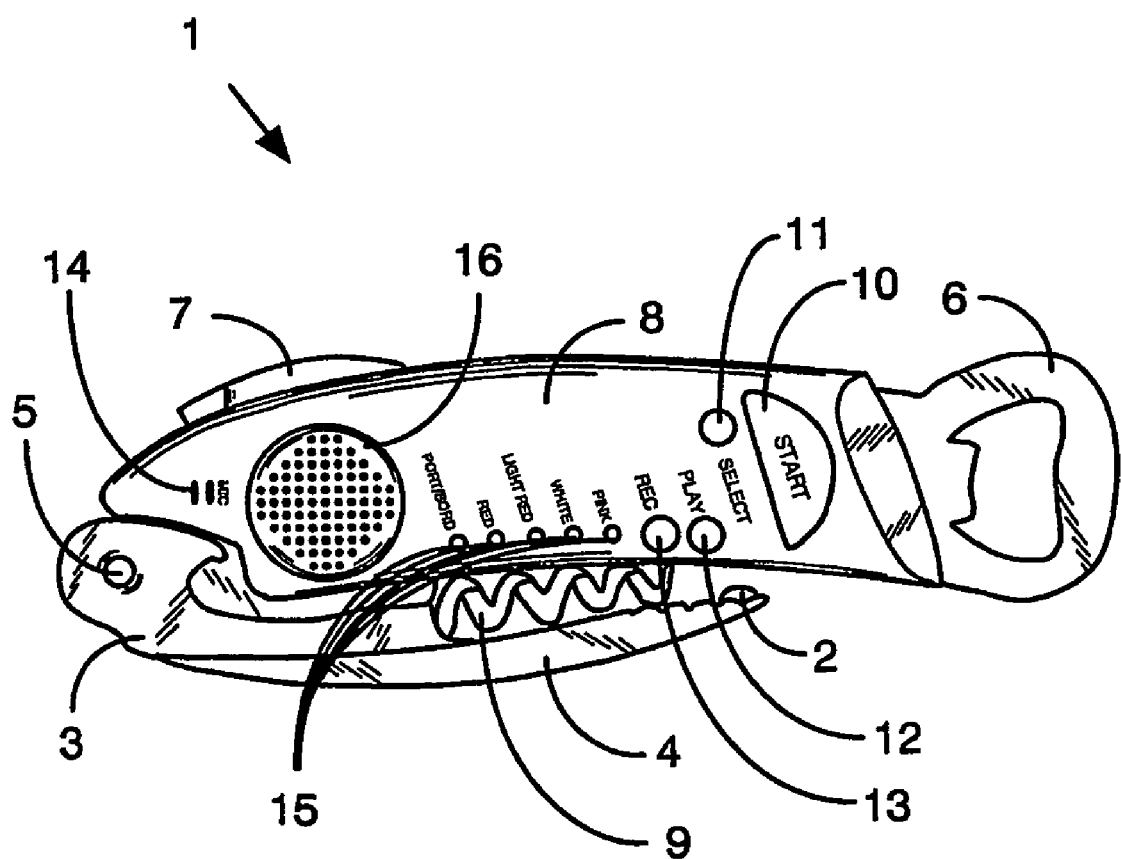
FIG. 1 is a front view of a preferred embodiment of the Corkscrew with Integral Intelligent Thermometer in the closed position.

This specification incorporates by reference the material in U.S. Pat. No. 6,536,306.

Prior to a detailed discussion of the figures, a general overview of the features and advantages of the invention will be presented. In particular, a discussion of the advantages of infrared technology when measuring when temperature within the bottle without breaking the seal of the wine bottle. The present invention provides the ability to measure wine temperature from outside the wine bottle while giving an accurate reading of the wine inside the sealed bottle. It has been found that infrared (IR) technology can be used for this purpose, providing that specific frequencies and steps are used.

Infrared will read surface temperature when measuring glass. In addition, the thickness of the walls of a wine glass bottle varies, because it is non controllable when the glass bottle is blown. Approximately half way down the middle it forms a subtle wave. You can see this more easily in green bottles. The glass is also usually thicker at the bottom of the bottle. The process is the same for bottles of all color including clear bottles.

Bottle sides typically range as follows:
$50^{th}$ of an inch to
$150^{th}$ of an inch.
Inches to mm are:
0.05=1.270 mm
0.15=3.810 mm Champagne bottles are the thickest at approximately 0.25 in. When a bottle at ambient temperature (70 F) is chilled in cold water (55 F), first the glass will cool. Because heat flows toward cold, the glass draws the heat out of the liquid in the bottle, and the liquid will equalize with the bottle temperature. Due to the thermal conductivity of glass, it will typically take approximately 5 minutes for the temperature equalization to occur. Temperature can also be measured by using time. Every material has radiation temperature, heat or lack of heat. Heat transfers are an effective way to measure temperature. Heat transfer, between ice and the bottle are faster than air to bottle due to the higher density of the ice. By using the heat transfer times, an IR radiometer can be used to compute the temperature of a sealed bottle of wine.

Test measurements were obtained using several sealed bottles of wine that were chilled with varying methods and to specific predetermined temperatures. The test used the outside of the wine bottles at indicated points over a period of charted time. When the bottle reached optimal drinking temperature the bottle was then opened and wine was poured into a glass. Using a liquid thermometer to measure wine would determine if the IR readings taken outside of the bottle were consistent with the true temperature of the wine inside. Testing the wine inside the glass with liquid thermometer, using IR outside the glass as well as IR pointed at the wine inside the glass was successful in displaying consistent and accurate temperature. The liquid was the same temperature as in the bottle within a few degrees or less. The central portion of the bottle was found to be the most accurate measurement location. This is because the central portion of the bottle has the greatest mass of liquid and is less susceptible to temperature fluctuations which would occur in narrow channels, such as the neck of the bottle.

In summary, if IR frequencies suitable for measuring the temperature of glass are used; IR will allow the temperature sensor to detect an accurate reading of the temperature inside a sealed bottle of wine, by measuring the temperature outside the bottle. This is a significant improvement over the prior art in that the temperature can be determined without disturbing the contents of the wine bottle or breaking the seal. When the temperature reaches optimal drinking temperature for selected wine the user can be notified in any convenient manner, such as with a recorded message or indicator lamp. The temperature sensor can also be used after the bottle is opened and wine is poured by pointing at the wine left inside the bottle to see if it needs to be placed back into the ice bucket. Preferably, the IR thermometer can indicate the detected temperature in both Fahrenheit and Celsius.

The average temperature for a wine cellar should be 55 degrees plus or minus a few degrees (e.g., 53-57 degrees Fahrenheit) all wines, reds, whites, ports, etc., can be stored at this temperature. In contrast, the average temperature setting for a refrigerator is typically set to 36-42 degrees Fahrenheit. As a result, an individual will typically not drink wine immediately after taking the wine bottle out of the refrigerator. Rather, it is allowed to warm up to the proper drinking temperature. The ability to measure the wine temperature inside the bottle allows the user to delay opening the bottle and the wine is actually ready to drink.

When comparing wine at various temperatures, the following observations can be made:

At 34 degrees—straight from the ice bucket. At 34 degrees, the wine loses complexity and is too cold. In fact, it will usually taste like a cold fruit concentrate.

At 54 degrees—from a wine cooler set to chill white wine at 54 degrees, or at 60 degrees—a chilled bottle set out for about an hour. Wine is most enjoyable when served at a temperature between 54 to 60 degrees.

At 72 degrees—room temperature. At this temperature, the wine is to warm to be enjoyed.

Care should be taken not to warm wine up too much, because there is a point of no return. In particular, you can't re-chill wine when it is in the glass.

To let a wine "breathe" is to expose it to air. However, this may change the flavor of a wine, but not necessarily for the better. The theory is that air can mellow the tannic or astringent quality in some types of wines. Typically, age is what mellows these flavors. The only wine that really needs to breathe are "dry reds" that are meant to be aged for many years before serving. Knowing what the temperature is inside the bottle provides the user with the ability to better control the amount of time they want the wine to breathe.

IR can be effective and accurate providing that particular frequency bands are used. Test results indicate that frequency specific IR sensors will provide an accurate reading of wine inside the bottle. It can also provide the user with a personal choice of allowing aged wine to breathe.

Referring to FIG. 1, this figure shows a front side view of a preferred embodiment of the corkscrew 1 is shown which has a temperature sensor 2 attached to the end of the lift lever extension 4 on the lift lever 3. The lift lever 3 is attached via pivot pin 5 to handle 8. A bottle opener 8 is located on the proximal end of the corkscrew 1, and a cutting blade 7 is located on the side edge of corkscrew 1. The cork removal screw 9 is shown in the folded position. A start button 10 is used to activate the battery operated device. Select button 11 is used in conjunction with play and record buttons 12 and 13 to control recording and playback of messages. Messages are recorded with microphone 14 and played back via speaker 16. LED indicators 15 are activated, based on the bottle temperature sensed by temperature sensor 2 to indicate the appropriate wine for that temperature. The corkscrew 1 can also play an audio message describing the correct temperature for a given wine.

In the preferred embodiment, the temperature sensor 2 uses infrared technology to sense the temperature of the wine in the bottle. However, those skilled in the art will recognize that any suitable technology can be used. For example, thermistors can be substituted for the infrared temperature sensors 2 used in the preferred embodiment.

Figure 2:
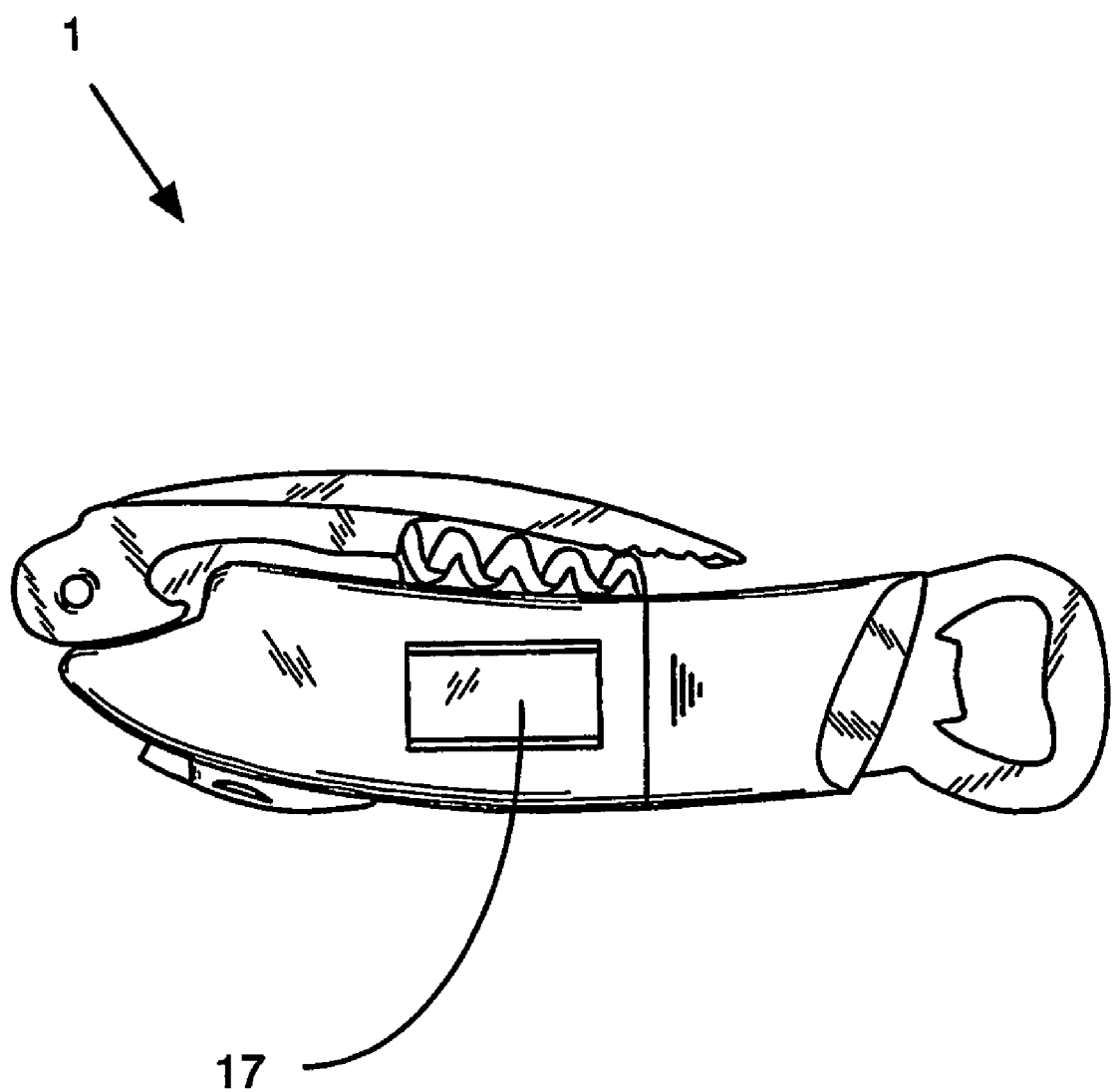
FIG. 2 is a rear view of a preferred embodiment of the Corkscrew with Integral Intelligent Thermometer in the closed position.

In FIG. 2, the rear side of the preferred embodiment of FIG. 1 is shown. This figure illustrates a magnet 17 which allows the device to be held by a metal surface, such as a refrigerator door.

Figure 3:
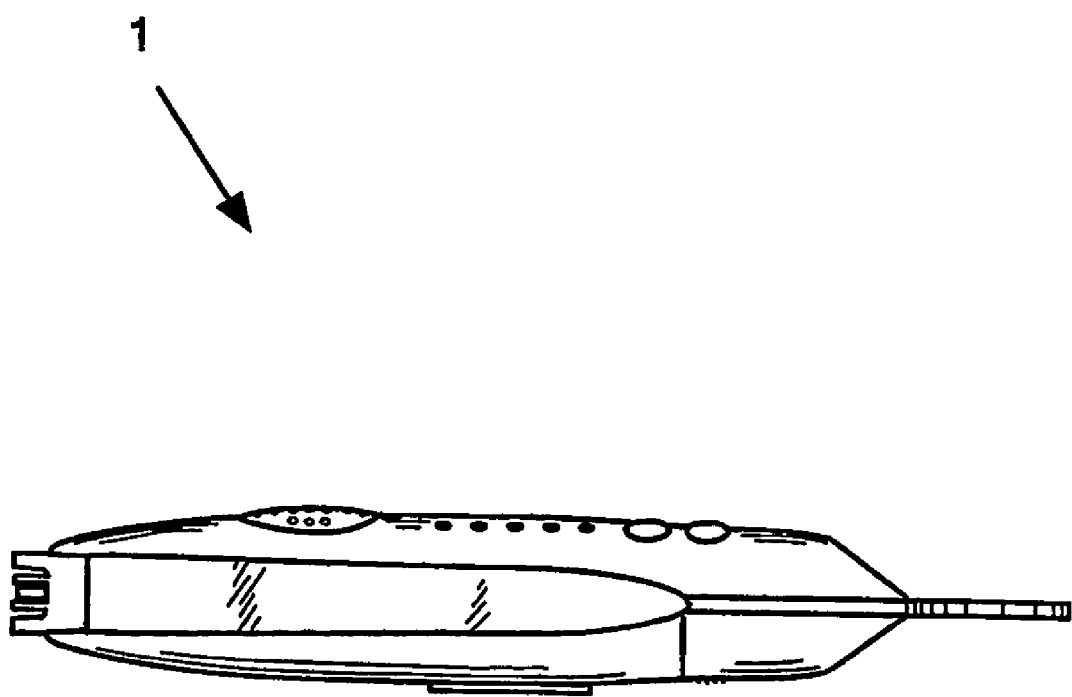
FIG. 3 is a right side view of a preferred embodiment of the Corkscrew with Integral Intelligent Thermometer in the closed position.

FIG. 3 is a right side view of a preferred embodiment of the corkscrew 1 with Integral Intelligent Thermometer in the closed position.

Figure 4:
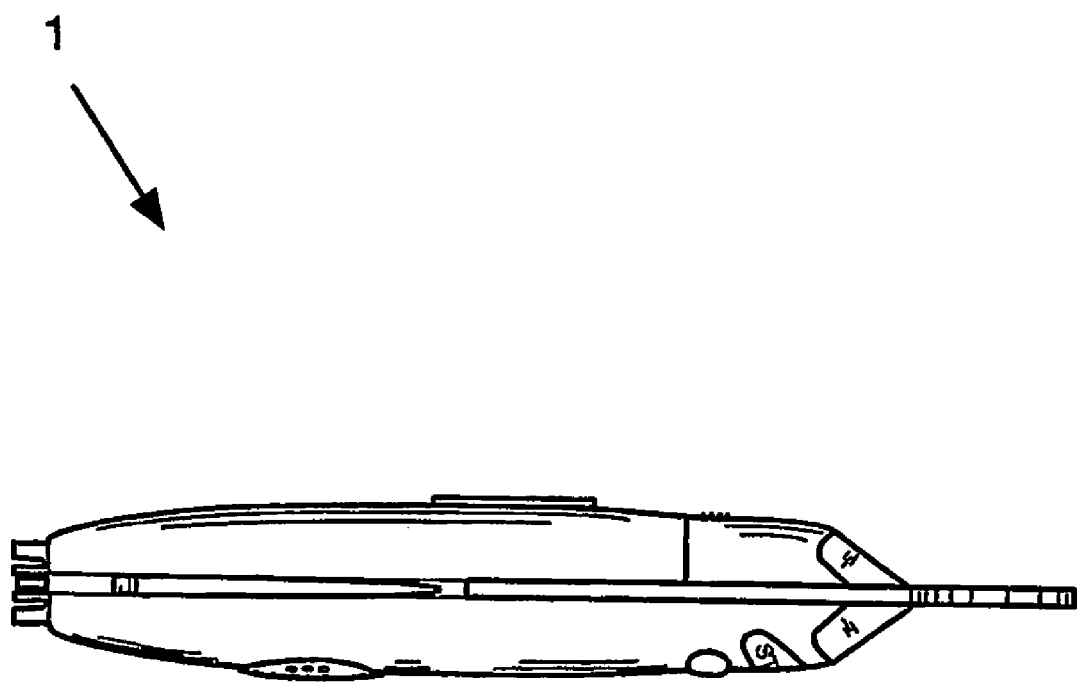
FIG. 4 is a left side view of a preferred embodiment of the Corkscrew with Integral Intelligent Thermometer in the closed position.

FIG. 4 is a left side view of a preferred embodiment of the corkscrew 1 with Integral Intelligent Thermometer in the closed position.

Figure 5:
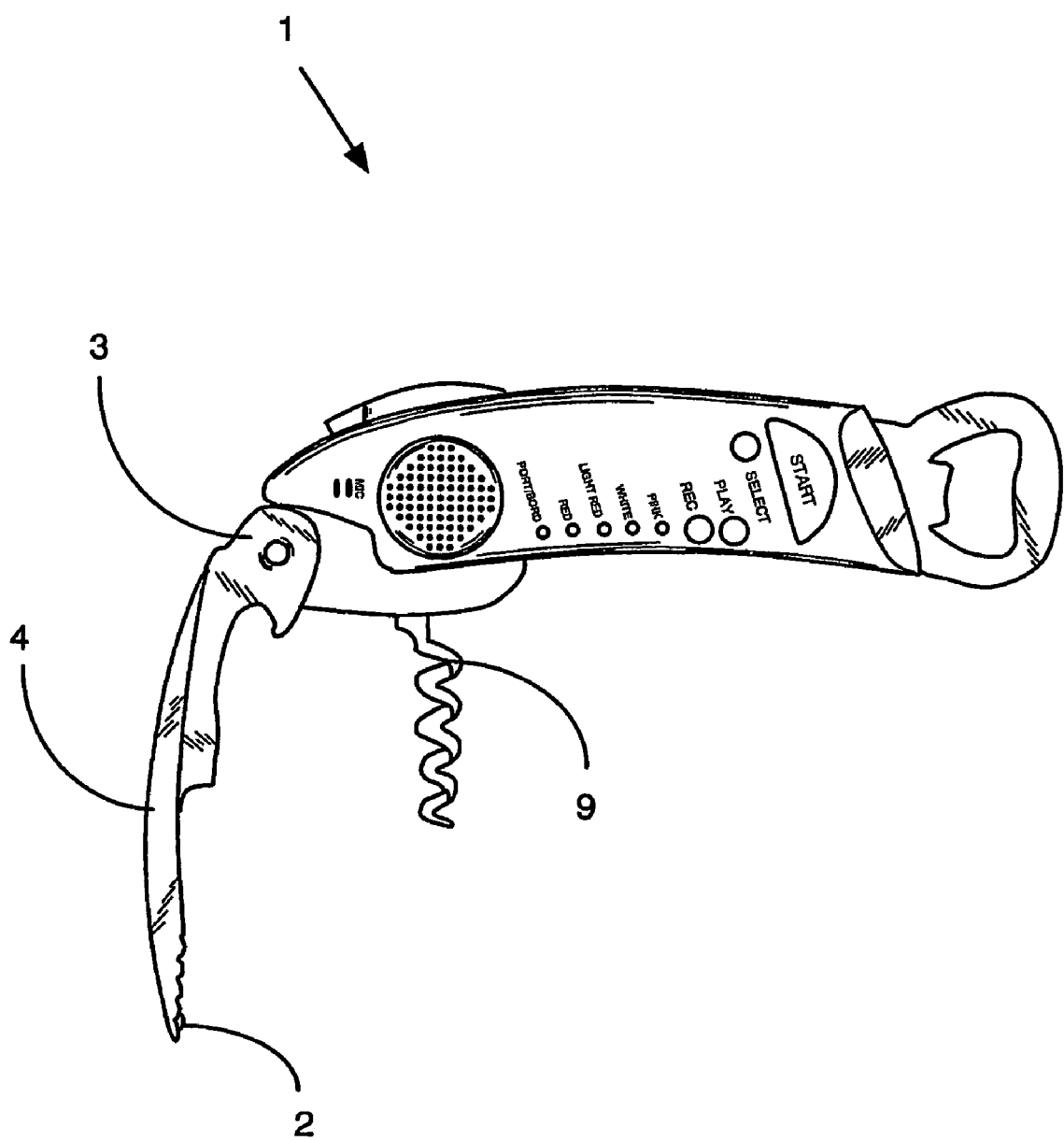
FIG. 5 is a front side view of a preferred embodiment of the Corkscrew with Integral Intelligent Thermometer with the corkscrew, and the lever arm with integral thermometer, in the open position.

FIG. 5 is a front side view of a preferred embodiment of the corkscrew 1 with Integral Intelligent Thermometer with the corkscrew, and the lever arm 4 with integral thermometer 2, in the open position.

Figure 6:
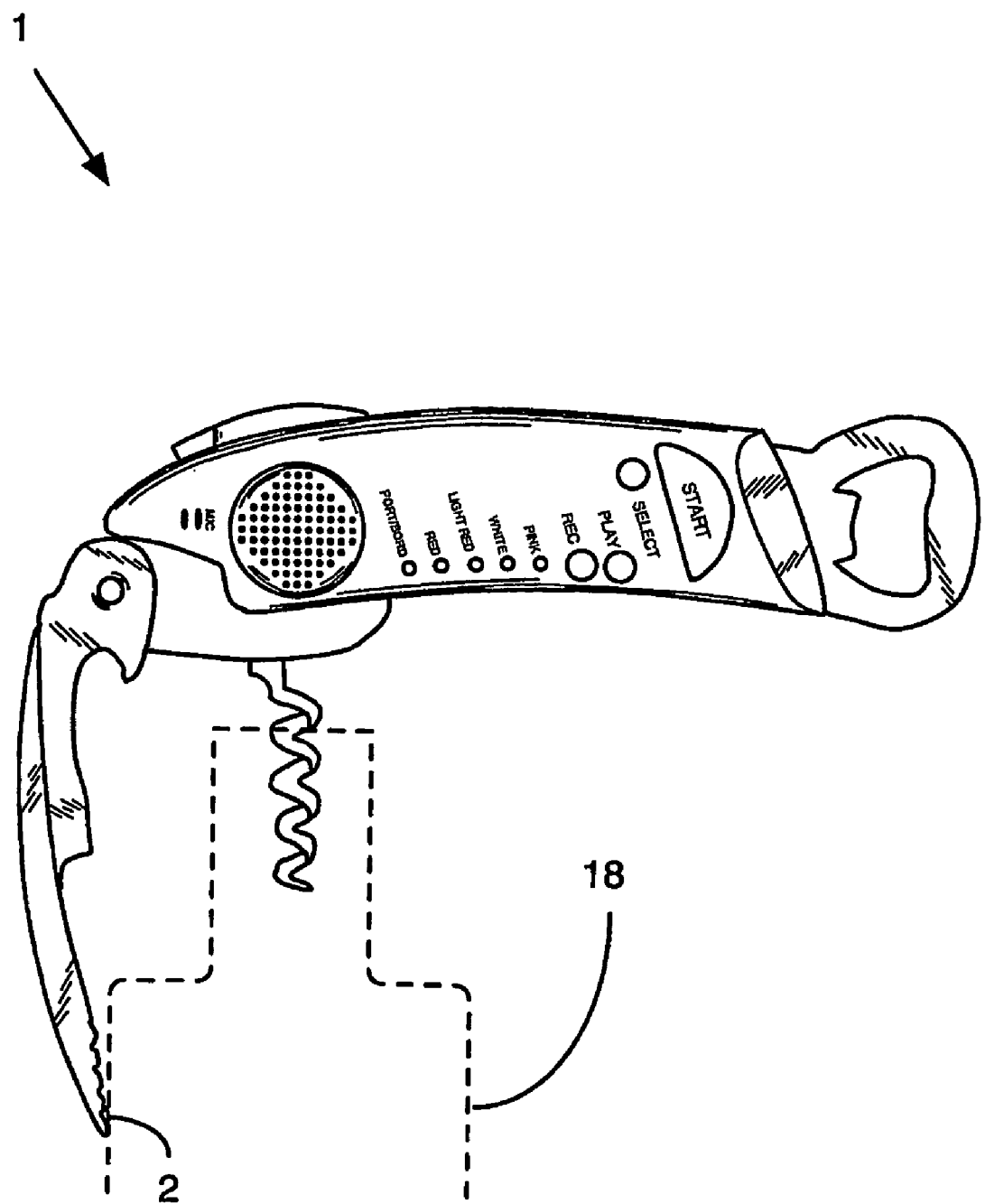
FIG. 6 is a right side view of a preferred embodiment of the Corkscrew with Integral Intelligent Thermometer with the corkscrew, and the lever arm with integral thermometer, in the open position. The lever arm with integral thermometer is shown touching a bottle to measure the temperature. The bottle is not part of the design.

FIG. 6 is a right side view of a preferred embodiment of the corkscrew 1 with Integral Intelligent Thermometer with the corkscrew 1, and the lever arm 4 with integral temperature sensor 2, in the open position. The lever arm 4 with integral temperature sensor 2 is shown touching a bottle 18 to measure the temperature. The bottle 18 is not part of the design.

Figure 7:
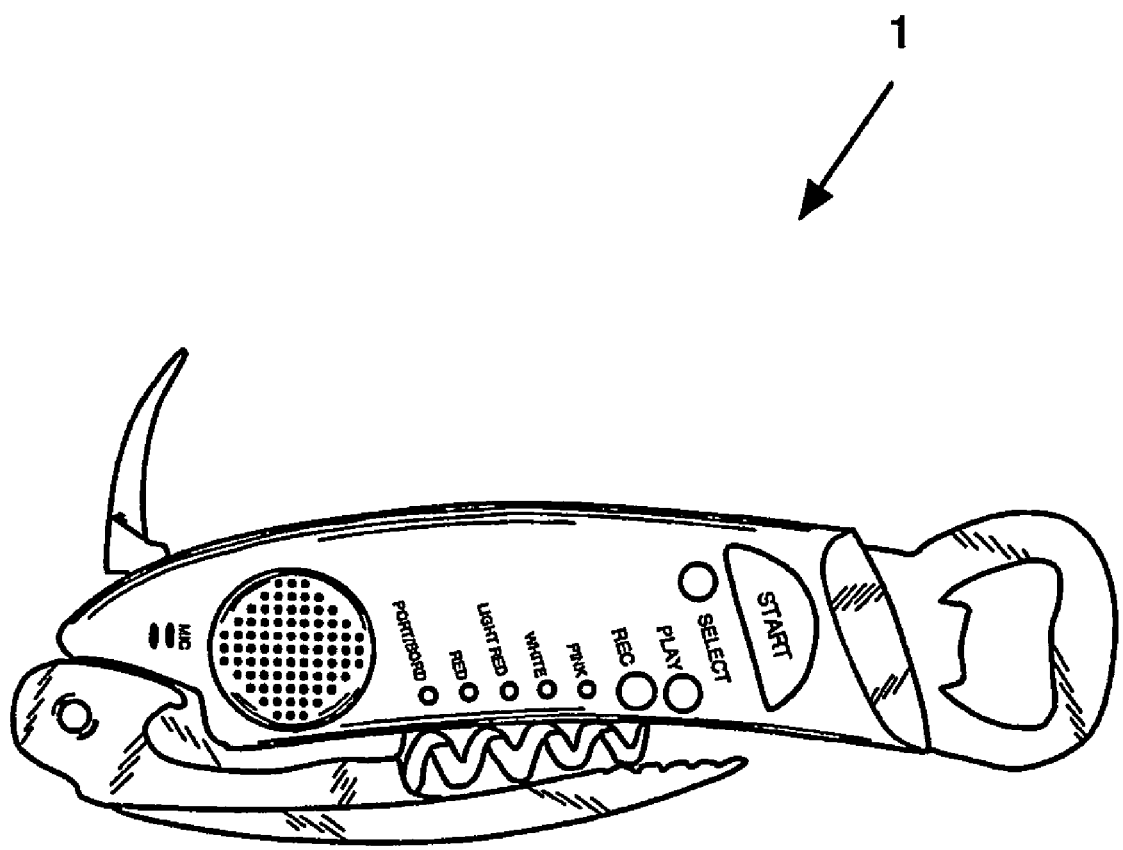
FIG. 7 is a left side view of a preferred embodiment of the Corkscrew with Integral Intelligent Thermometer with the corkscrew, and the lever arm with integral thermometer, in the closed position, and the cutting blade in the open position.

FIG. 7 is a left side view of a preferred embodiment of the corkscrew 1 with Integral Intelligent Thermometer with the corkscrew 1, and the lever arm with integral temperature sensor 2, in the closed position, and the cutting blade in the open position.

Figure 8:
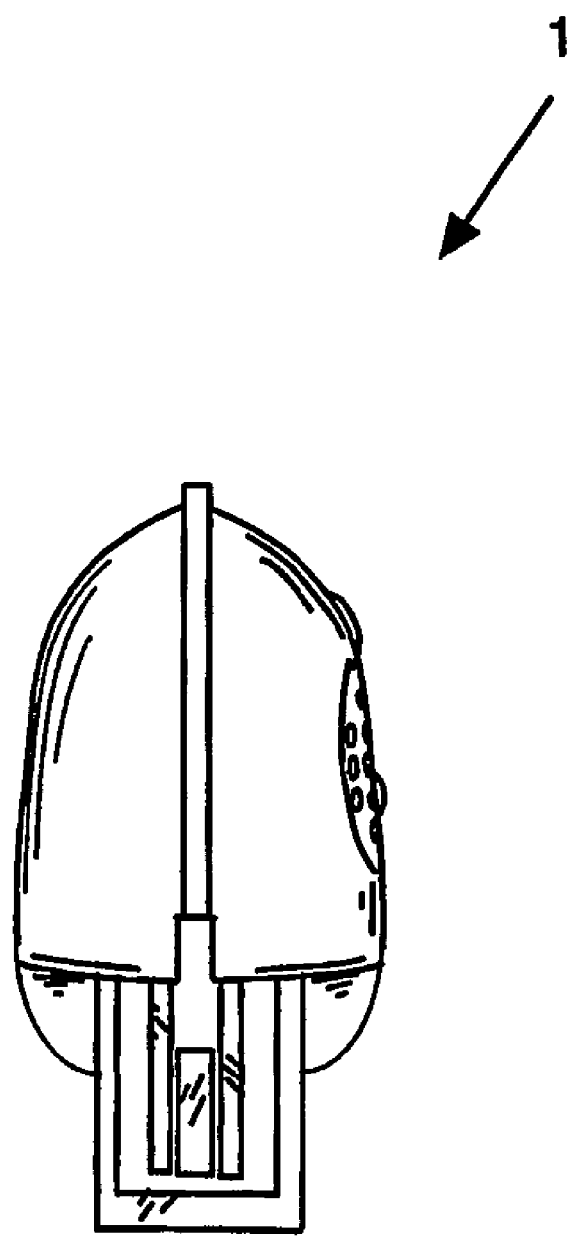
FIG. 8 is a distal end view of a preferred embodiment of the Corkscrew with Integral Intelligent Thermometer.

FIG. 8 is a distal end view of a preferred embodiment of the corkscrew with Integral Intelligent Thermometer.

Figure 9:
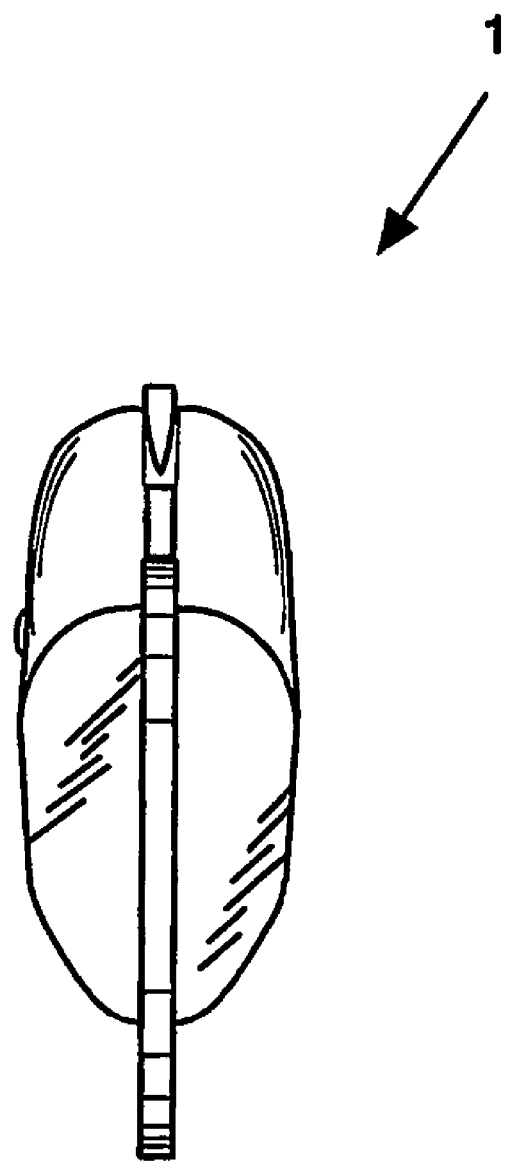
FIG. 9 is a proximal end view of a preferred embodiment of the Corkscrew with Integral Intelligent Thermometer.

FIG. 9 is a proximal end view of a preferred embodiment of the corkscrew with Integral Intelligent Thermometer.

Figure 10:
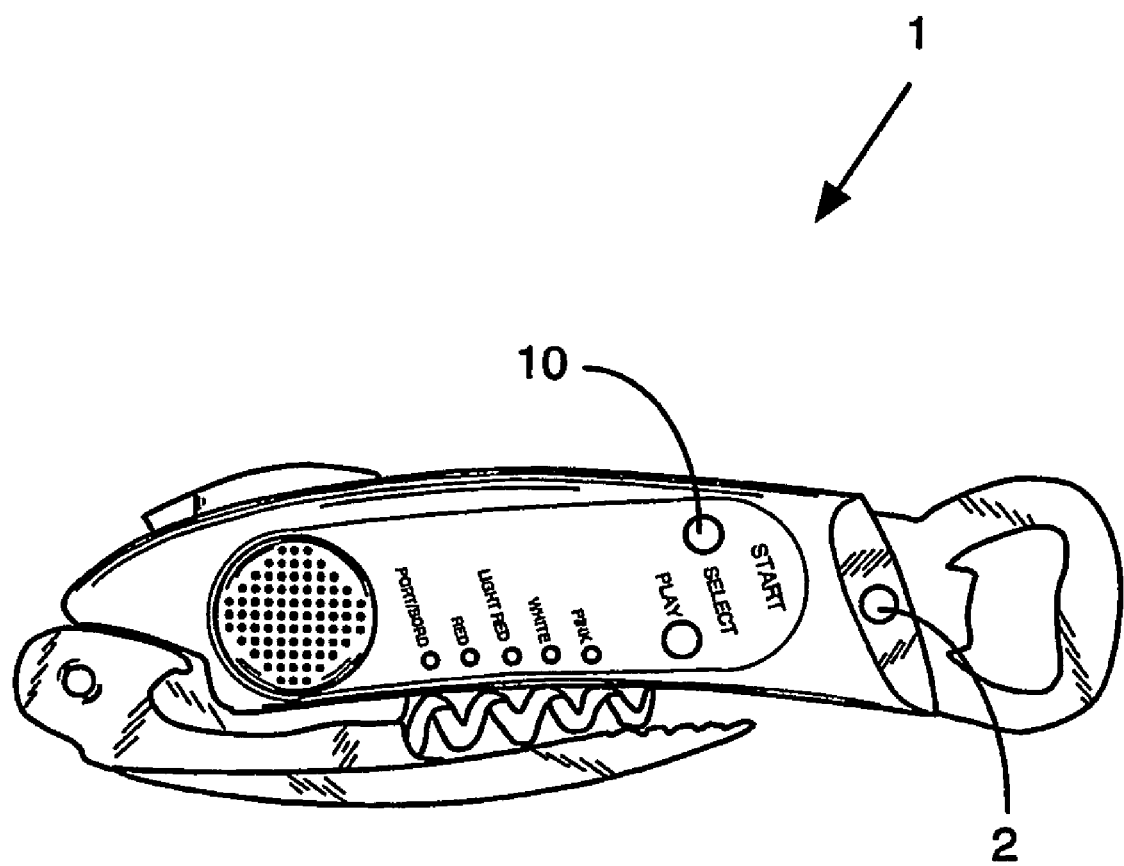
FIG. 10 is a front side view of an alternative preferred embodiment of the Corkscrew with Integral Intelligent Thermometer. This embodiment does not have a recording option.

FIG. 10 is a front side view of an alternative preferred embodiment of the corkscrew with Integral Intelligent Thermometer. This embodiment does not have a recording option. In addition, this embodiment also shows an infrared temperature sensor 2 that is mounted on the end of the corkscrew 1. An advantage of this embodiment is that it allows wine temperature to be measured without having the corkscrew 1 come in contact with a bottle. Further, it allows the wine temperature to be measured without breaking the seal of the wine bottle, thereby avoiding any potential degradation to the wine.

The use of infrared technology to measure wine temperature without physical contact with the wine bottle works as follows in regard to the measurement of wine temperature. When the user presses the start button 10, the temperature sensor 2 is activated. By holding a corkscrew 1 toward the body of the wine bottle 18, the temperature of the wine inside the bottle can be measured providing that the IR frequency is properly set. As a result, the user can wait until just the right moment to uncork the wine bottle 18.

Those skilled in the art will recognize that while the temperature sensor 2 is illustrated as an integral component of corkscrew 1, it can also be implemented as a standalone device separate and apart from a corkscrew 1.

Figure 11:
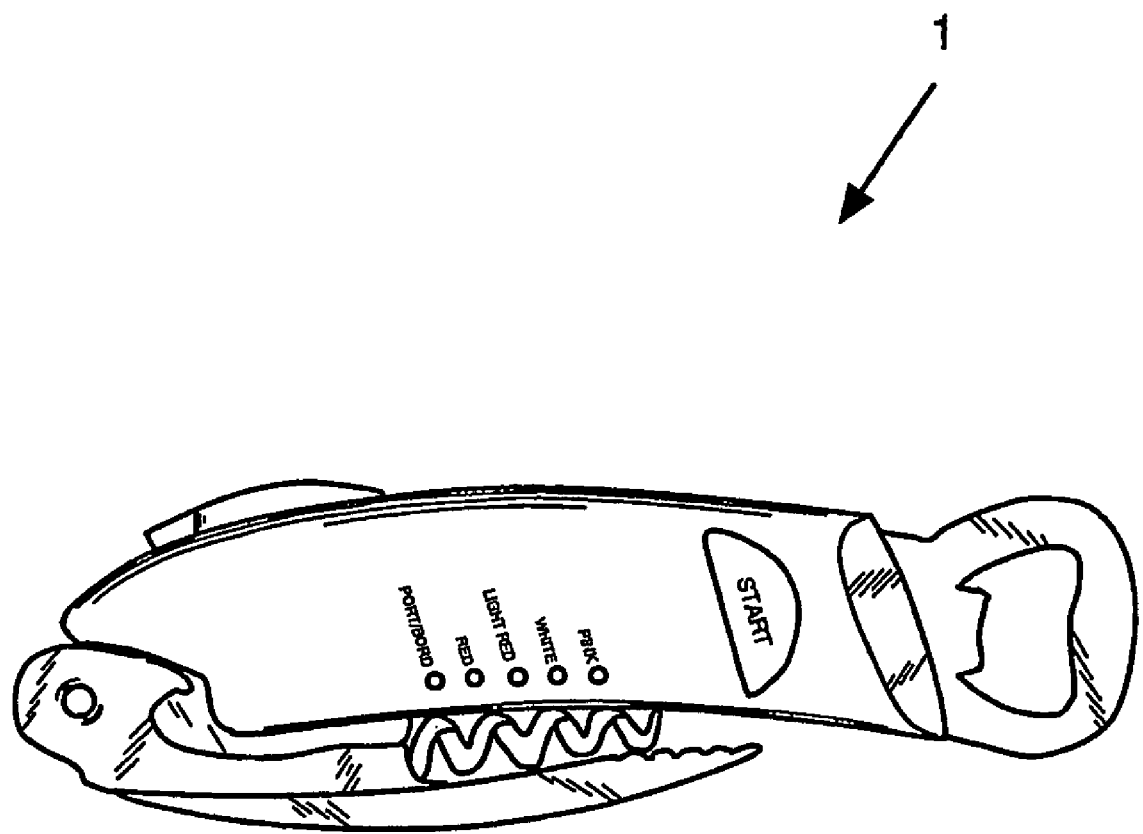
FIG. 11 is a front side view of another alternative preferred embodiment of the Corkscrew with Integral Intelligent Thermometer. This embodiment does not have a recording option of a speaker option.

FIG. 11 is a front side view of another alternative preferred embodiment of the corkscrew with Integral Intelligent Thermometer. This embodiment does not have a recording option or a speaker option.

Figure 12:
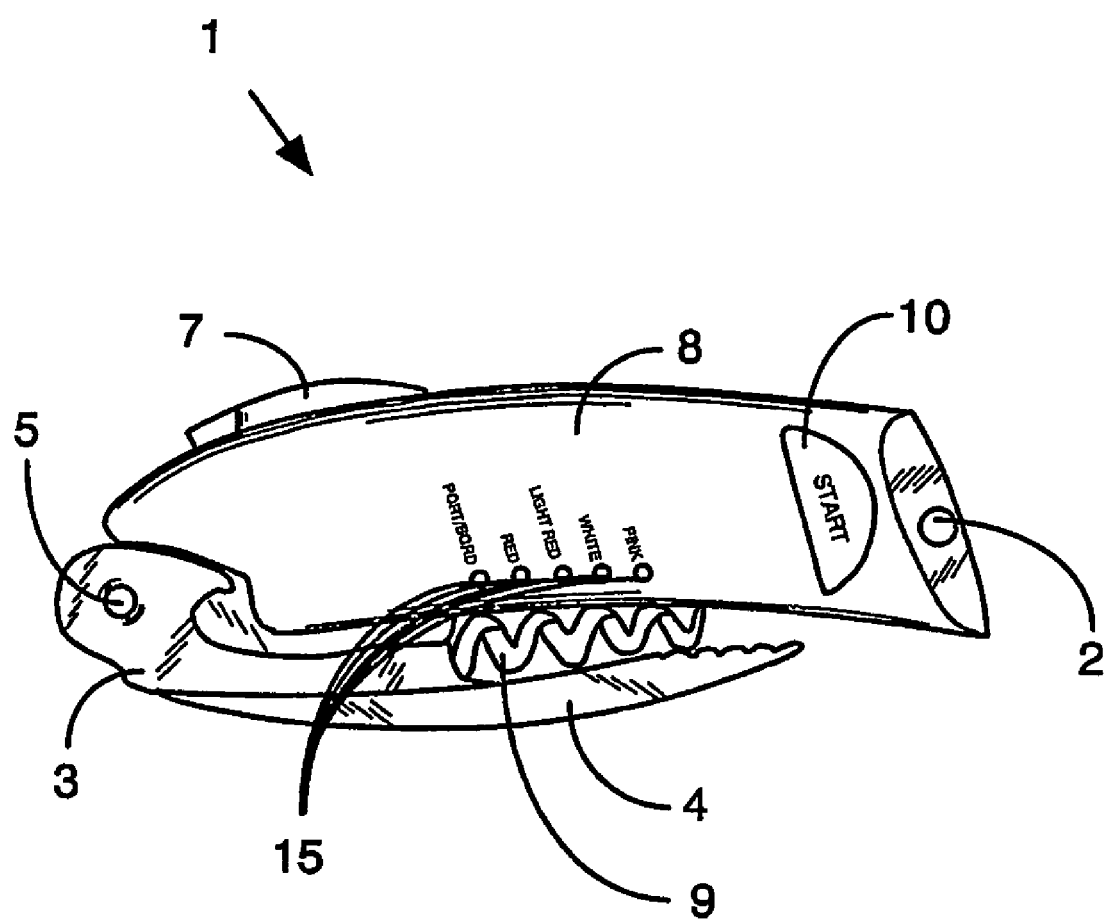
FIG. 12 is a front side view of another alternative embodiment which eliminates the optional audio components, and the optional bottle cap remover. The temperature sensor is located on the body of the corkscrew rather than the lever arm.

FIG. 12 is a front side view of another alternative embodiment which eliminates the optional audio components, and the optional bottle cap remover 6. The temperature sensor 2 is located on the body of the corkscrew rather than the lever arm 4. Those skilled in the art will recognize that location of the temperature sensor is not critical and may be placed in any convenient spot. Likewise, as discussed above regard to the previous embodiments, the temperature sensor 2 can be any suitable technology such as an infrared sensor, a thermistor, etc.

Figure 13:
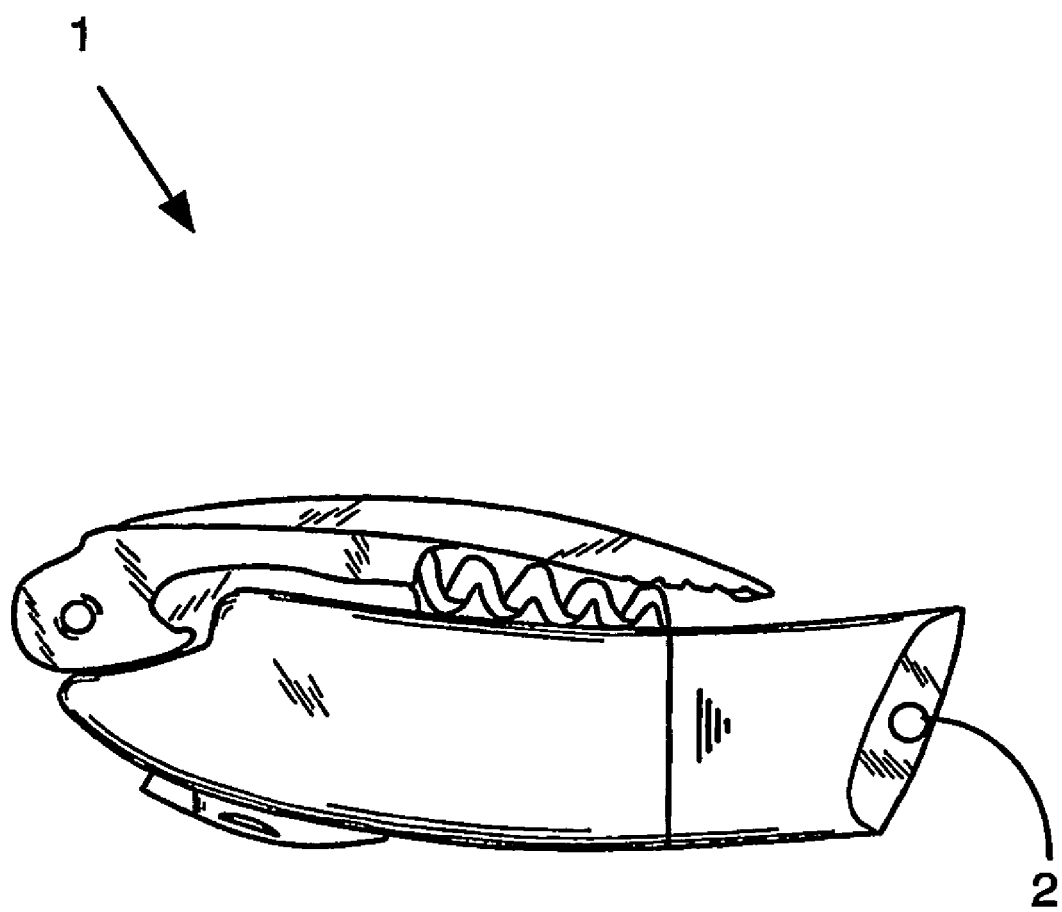
FIG. 13 is a rear side view of the alternative embodiment of FIG. 12 which eliminates the optional magnet, and the optional bottle cap remover. The temperature sensor is located on the body of the corkscrew rather than the lever arm.

FIG. 13 is a rear side view of the alternative embodiment of FIG. 12 which eliminates the optional magnet 17, and the optional bottle cap remover 6. The temperature sensor 2 is located on the body of the corkscrew rather than on the lever arm.

While the invention has been described with respect to preferred embodiment thereof, it will be understood by those skilled in the art that various changes in detail may be made therein without departing from the spirit, scope, and teaching of the invention.

The invention claimed is:

1. An intelligent corkscrew for use with corked bottles, comprising:
   a cork removal screw pivotally attached to the corkscrew;
   an infrared temperature sensor in the corkscrew to detect the temperature of the bottle;
   means to output the detected temperature of the bottle prior to removal of the cork; and a lift lever pivotally attached to the corkscrew, the lift lever having a lift lever extension, the infrared temperature sensor is mounted on the lift lever extension such that the infrared temperature sensor contacts the corked bottle when the lift lever is in contact with the corked bottle.

2. A method of measuring liquid temperature inside a bottle prior to unsealing the bottle, including the steps of:

momentarily disposing an infrared temperature sensor in a proximate, spaced relation to the bottle, the infrared temperature sensor using infrared frequencies having wavelengths of approximately 0.7 to 0.4 microns such that the infrared frequencies passed through the exterior wall of the bottle and measure the temperature of the bottle's contents;

pointing the infrared temperature sensor at the bottle and using the infrared temperature sensor to measure temperature of liquid inside the bottle;

incorporating the infrared temperature sensor into a lever arm of a corkscrew, such that the temperature of a corked bottle is automatically measured when the corkscrew is placed in position to remove the cork; and outputting the measured temperature without unsealing the bottle.

3. A method, as in claim 2, including additional step of:
using a bottle containing wine.

4. A method of measuring liquid temperature inside a corked bottle prior to unsealing the bottle, including the steps of:

incorporating an infrared temperature sensor into a lever arm of a corkscrew, such that the temperature of the bottle is measured when the corkscrew is placed in position to remove the cork; and outputting the measured temperature.

* * * * *